United States Patent [19]

Murphree et al.

[11] 3,725,855

[45] Apr. 3, 1973

[54] SYSTEM FOR DETERMINING DIRECTION OF ARRIVAL OF SIGNALS

[75] Inventors: Francis J. Murphree, Winter Park; Peter D. Kenndey, Casselberry; Richard B. Webster, Winter Park, all of Fla.

[73] Assignee: The United States of America as represented by the Secretary of the Navy

[22] Filed: Aug. 23, 1971

[21] Appl. No.: 173,762

[52] U.S. Cl. ............... 340/6 R, 340/16 P, 343/113 R
[51] Int. Cl. ................................................ H04b 7/08
[58] Field of Search .......... 343/113 R; 340/6 R, 16 P

[56] References Cited

UNITED STATES PATENTS

| 3,383,690 | 5/1968 | Keller ............................ 343/113 R |
| 3,540,054 | 11/1970 | Broderick ....................... 343/113 R |

Primary Examiner—Benjamin A. Borchelt
Assistant Examiner—N. Moskowitz
Attorney—Richard S. Sciascia et al.

[57] ABSTRACT

Determination of direction from which energy waves, e.g., sonar signals, arrive utilizes a plurality of pairs of hydrophone probes on a common axis and averages time delays of one pair with delays of other pair. Circuitry rejects first portion of signals, then selects equal number of signals from each probe pair for averaging.

7 Claims, 4 Drawing Figures

SYSTEM FOR DETERMINING DIRECTION OF ARRIVAL OF SIGNALS

BACKGROUND OF THE INVENTION

This invention relates to systems for determining the direction of a source of signals, for example sound waves received through the water by transducers mounted on a mobile submarine simulator.

Both passive and active homing torpedoes employ nose mounted hydrophones used in conjunction with well-known techniques to measure the direction (or some quantity related to it) from which noise or echoes arrive. The hydrophones need be sensitive over a relatively narrow angle in the forward direction. A mobile target simulator, however, must be sensitive to and measure to relative bearing of sounds generated by an active sonar that may be located anywhere within a horizontal angle of 360°. This requirement exists because such simulators carry complex circuitry for synthesizing and transmitting, in response to active sonar signals, simulated echo signals which would be characteristic of a full size submarine vessel of a particular class, and to be realistic the simulated echo must be approximately $(2S/C \mid \cos\theta \mid + \tau)$ seconds long, where $\theta$ is the angle between a line to sonar and the axis of the vehicle, S is the length of the target whose echo is being simulated, C is the velocity of sound in water, and $\tau$ is the sonar pulse length. U.S. Patent Application Serial No. 134,558, filed April 16, 1971, and assigned to the assignee hereof, provides an example of such sonar echo simulation.

$\mid \cos\theta \mid$ may be determined approximately by measuring the electrical delay between the output of each pair of probes (small, nondirectional hydrophones) mounted parallel to the center line of the vehicle just forward of the nose. U.S. Pat. No. 3,383,690 to Ernest A. Keller is illustrative of a prior art system which can be used in doing so.

In free space the delay $t_d = X/C \mid \cos\theta \mid$; hence $\mid \cos\theta \mid = Ct_d/X$, where $X$ is the spacing between the probes. The proximity of the vehicle nose, however, causes the actual measured time delay to differ from the value that would be measured in free space since the phase of the signal in each probe is determined by the resultant of a direct signal and a reflected signal from the vehicle nose. The connection between the electrical phase $\phi$ between two signals of the same frequency and the separation in time $t_d$ between the occurrence of, say, the zero crossing of each signal is:

$$\phi = 2\pi f t_d \text{ and } t_d = \phi/2\pi f.$$

If $\phi$ has a value different from that which should exist determined solely by the relation $(2\pi fX/C \mid \cos\theta \mid$, $t_d$ will be in error and ultimately the length of the simulated echo will not have the value that it should have for the angle $\theta$ that actually exists.

One obvious solution to this effect would be to support the spaced probes so far in front of the reflecting nose surface that $\theta$ they are substantially in free space. To do so, however, is impractical from the aspect of mechanical support and vulnerability of the probes.

SUMMARY OF THE INVENTION

With the foregoing in mind it is a principal object of this invention to provide an improved system for determining the direction of a source of signals, preferably in terms of $\mid \cos\theta \mid$ where $\theta$ is the angle between the axis of a plurality of sensing probes and the direction from which the signals arrive.

Another object of the invention is to provide such a system wherein two or more pairs of probes are so mounted and the outputs thereof so processed as to minimize errors introduced by wave energy reflected from the surface of the vehicle on which the probes are supported.

As another object the invention contemplates novel signal processing circuitry which rejects predetermined portions of the outputs of the probe pairs and averages an accepted portion, thereby relying on portions of signals which are less prone to error.

Other objects and advantages of the invention will become apparent from the following description of the preferred embodiment when read in conjunction with the accompanying sheets of drawings.

DESCRIPTION OF THE PREFERRED EMBODIMENT

Figure 1:
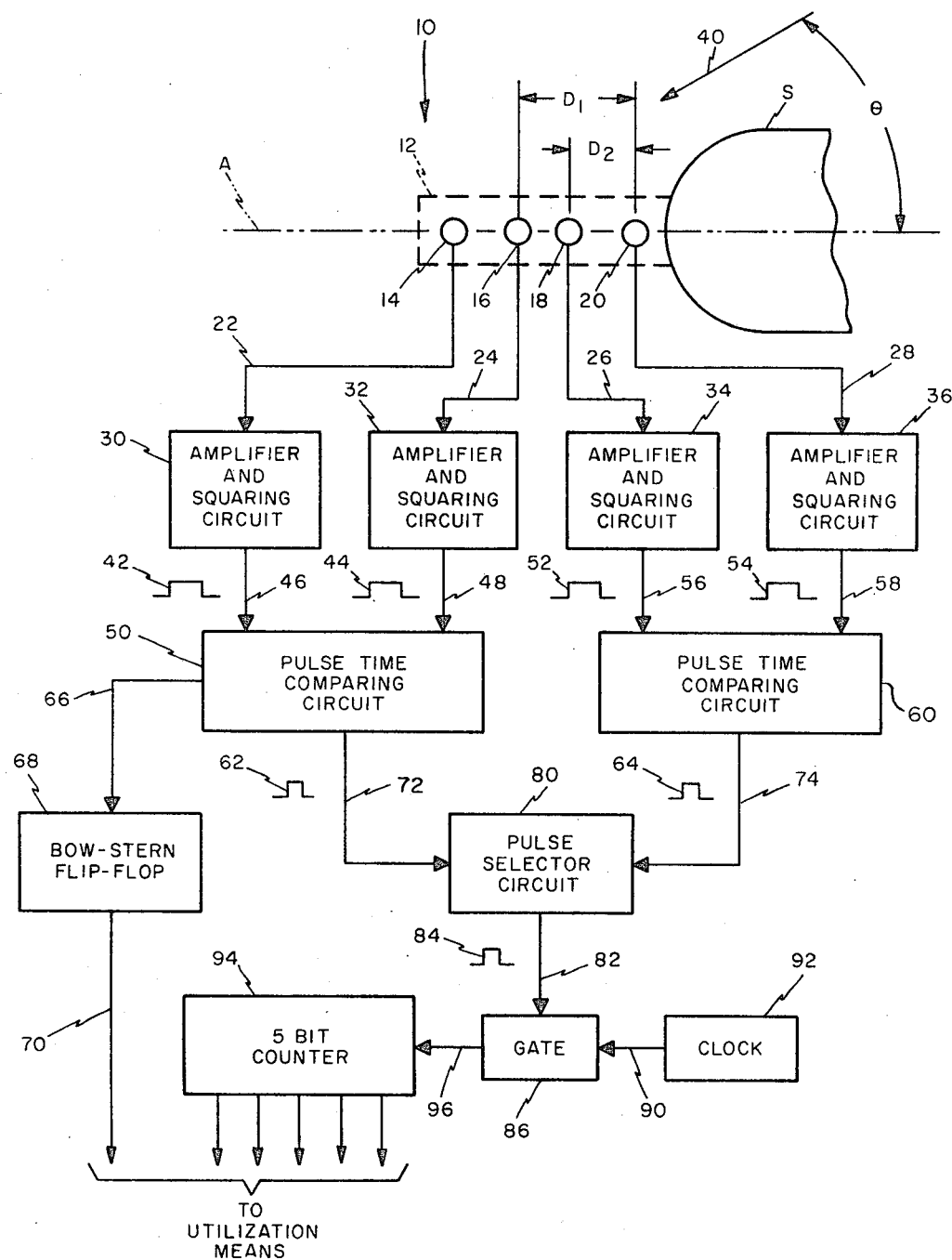
FIG. 1 is a diagrammatic illustration in block form of a direction determining system embodying the invention.

In the form of the invention illustrated in the drawings and described hereinafter, and with particular reference now to FIG. 1, a direction determining system 10 is shown in association with a mobile submarine or target simulator S which conveniently carries the system as an adjunct to echo synthesizing circuitry for example of the type described in the earlier mentioned patent application. The system 10 comprises a hydrophone or probe assembly 12 mounted on the nose of the simulator S. The probe assembly comprises a first pair of hydrophones or probes 14 and 16, and a second pair of hydrophones or probes 18 and 20 between the first pair and the nose of the simulator. The probes 14, 16, 18, and 20, which are disposed in spaced relation along the axis A of the simulator S, are respectively connected as shown by lines 22, 24, 26, and 28 to amplifier and squaring circuits 30, 32, 34, and 36. The latter are of any conventional construction suitable to amplify and square the outputs of the probes in response to pressure variations of passing energy waves, e.g., signals from an active sonar source in the direction indicated by arrow 40. The angle $\theta$ between the direction of movement of the signals, is of course the relative bearing of the source, or viewed from the source, the aspect angle of the simulator.

The spacing of the probes along the axis is preferably such that the first pair 14 and 16 are spaced approximately one-quarter wave length of the median frequency concerned from the pair 18 and 20. This pair spacing is indicated at $D_1$ in FIG. 1 and is measured between corresponding probes of the two pairs. The distance $D_2$ between probes of a given pair is ordinarily less than the pair spacing $D_1$ and in one working embodiment the probes within a pair are spaced about one tenth wave length from each other. The adjacent probes 16 and 18 of the two pairs may be placed as close together as is mechanically possible and, as has been done in one actual embodiment, may in fact be the same probe. The two pairs, in that embodiment comprise only three probes, the center one of which is common to each pair. While the following description and claims will, for the sake of clarity, treat the two pairs as consisting of four probes, it will be understood that one probe may be common to each. All of the probes are advantageously mounted as far ahead of the nose of the simulator S as is mechanically feasible to reduce shadow effects when signals are received from the rear.

The squared outputs 42, 44 of the circuits 30 and 32 are applied as shown by lines 46, 48 to a pulse time comparing circuit 50, while the squared outputs 52, 54 of the circuits 34 and 36 are applied as shown by lines 56 and 58 to a pulse time comparing circuit 60. For any angle of $\theta$ other than 90°, or a beam aspect, there will exist a time delay between the arrivals of each wave at the various probes. The circuit 50, presently described in more detail, serves to provide a train of output pulses 62 the widths of which pulses are equal to the time delays between probes 14 and 16. Similarly the circuit 60 serves to provide a train of output pulses 64 the widths of which equal the time delays between probes 18 and 20. In addition, the circuit 50 provides on line 66 a signal indicative of whether the passing waves arrived first at probe 14 or probe 16. This is applied to a flip-flop 68 which provides an output on line 70 to the echo simulating utilization means for distinguishing between a bow and a stern aspect.

The pulses 62 and 64 are applied as indicated by lines 72, 74 to a pulse selector 80. The pulse selector 80, which will be more fully described as this specification proceeds, serves to reject a predetermined number of pulses derived from each pair of probes for a given signal reception, and then passes a predetermined portion of the remainder via line 82 as the enabling input pulses 84 to a gate 86. The gate 86 is connected to receive, via line 90, clock pulses generated by a suitable clock 92, and to gate to a five bit counter 94, via line 96, a portion of those clock pulses determined by the widths of the pulses 84 provided via line 82. The purpose of this process is to derive a count in the counter which is proportional to the average of the widths of pulses 84 and, if desired, by proper selection of the clock frequency $f_c$ to provide a count which is numerically equal to $|\cos\theta|$ for direct application to a sonar echo synthesizer.

In the present example and as will later be shown, the circuit 80 rejects the first pulses received in order to avoid distortions which may often be present at the beginning of a sonar transmission pulse or ping. The number of such first pulses so rejected is selected according to circumstances of use and design. In the present example the circuit 80 rejects the first eight pulses 62 received via line 72. The circuit 80 will then select the next two of the pulses 62 from the circuit 50 followed by two of the pulses 64 from the circuit 60 to pass as enabling pulses 84 to the gate 86. The pulses 84 will vary in width from pulse to pulse because of variables including sonar frequency, pressure, and reflections from the supporting vehicle. Consider four pulses 84 to have varying widths in seconds of $t_1$, $t_2$, $t_3$, and $t_4$. If the frequency of clock 92 is $f_c$, then the count achieved in the counter 94 for a given transmission sample is proportional to $(t_1+t_2+t_3+t_4)f_c$. The three most significant bits of the counter output can be utilized, along with the output of the bow-stern flip-flop 68 as a four bit address for example to a core memory to select a proper modulation envelope for transmission of a synthetic echo. Such utilization, however, forms no part of the invention per se.

Figure 2:
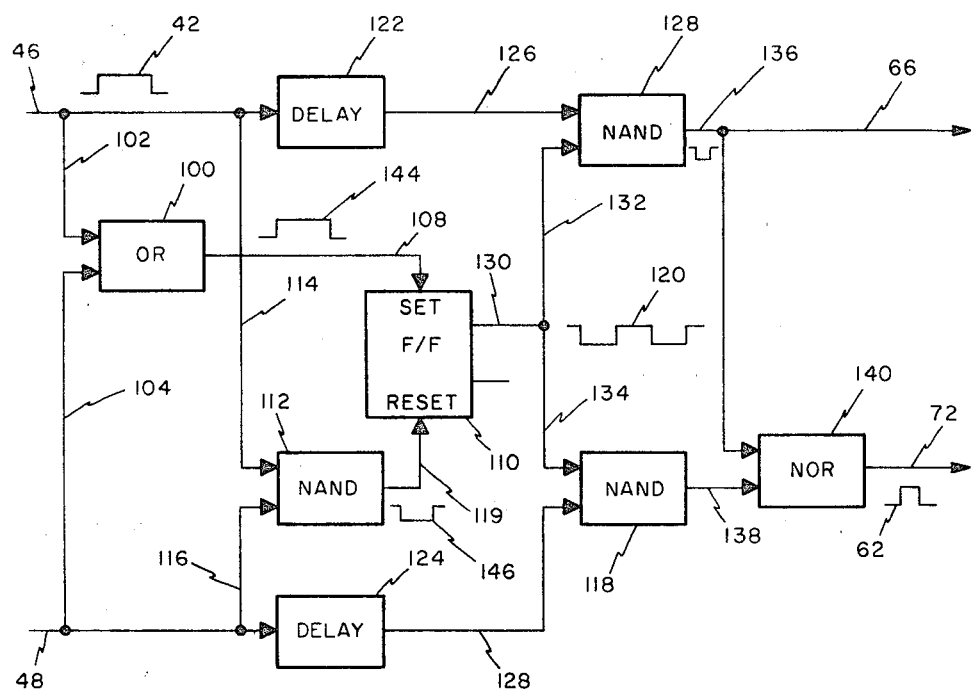
FIG. 2 is a block diagrammatic illustration in greater detail of the pulse time comparing circuit forming part of the system of FIG. 1.

Referring now to FIG. 2, the pulse time comparing circuit 50 will be described in more detail. Inasmuch as the circuit 60 may be identical to circuit 50 with the exception of the output of line 66, only the latter will be described in detail. The circuit 50 comprises OR gate means 100 connected by lines 102, 104 to receive as inputs the squared outputs 42, 44 of the probes 12 and 16 on lines 46, 48. The output of the OR gate means 100 is applied via line 108 to the set terminal of a bistable multivibrator or flip-flop 110.

The circuit 50 further comprises NAND gate means 112 connected by lines 114, 116 to receive the input pulses 42, 44. The output of NAND gate means 112 is connected via line 119 to the reset terminal of the flip-flop 110.

The input pulses 42, 44 arriving respectively on lines 46, 48 are also applied via delay means 122, 124 and lines 126, 128 to NAND gate means 128 and the NAND gate means 118. These NAND gate means 118 and 128 are further connected to receive the output 120 of the flip-flop 110, as shown by lines 130, 132, 134, when the flip-flop is in a set condition. The outputs of the NAND gate means 118, 128 are connected as shown by lines 136, 138 to the inputs of a NOR gate means 140, the output of which is provided on line 72 to the pulse selector 80.

Figure 3:
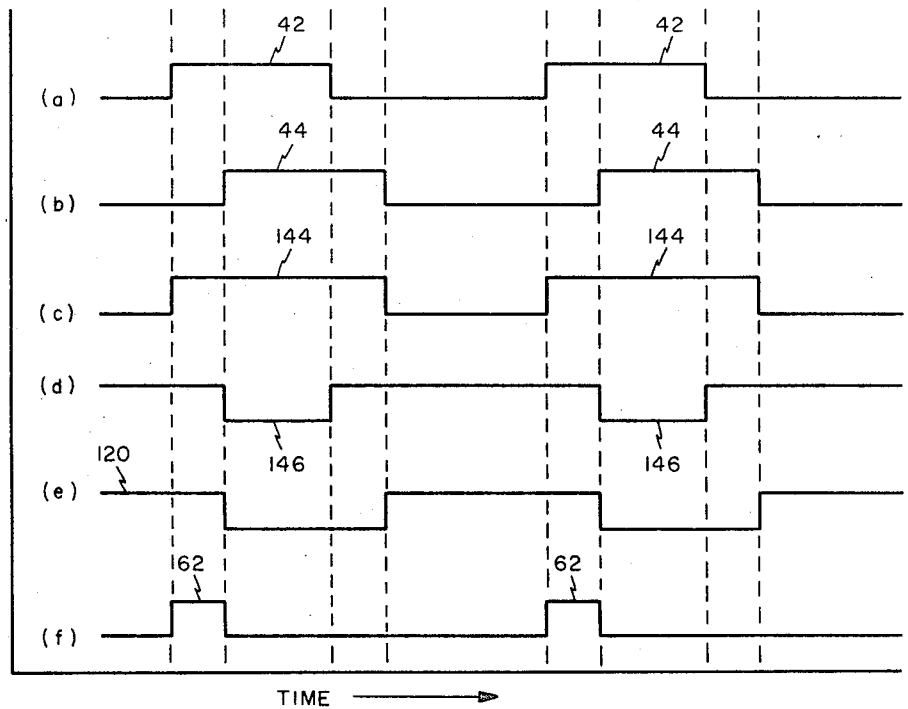
FIG. 3 is a graphic illustration of pulse time relationships.

The operation of the circuit 50 of FIG. 2 can best be appreciated by reference also to the time relations illustrated in FIG. 3. Assuming for example that a sonar signal arrives at the hydrophone array from a direction represented by angle $\theta$ such that the pulses 43 derived from the probe 16 lag behind the pulses 42 derived from the probe 14. This relation is indicated by the relation of pulses 42 and 43 on base lines (a) and (b) of FIG. 2. The OR gate means 100 will provide output pulses 144 which begin with the leading edge of each pulse 42 and end with the trailing edge of each pulse 43, as shown on line (c) of FIG. 2. The NAND gate means 112, receiving the pulses 42, 44 will provide an inverted output pulse 146 during each period the pulses 42, 44 coincide, as shown on line (d) of FIG. 2.

The flip-flop 110 is set by the output 144 of the OR gate means 100 and reset by NAND gate means 112.

The output 120 of the flip-flop 110, line (e) of FIG. 2, is low during whatever time the lagging input pulse (44 in this example) is positive, and when the flip-flop output is low it serves to inhibit the NAND gate means 128, 118. The output 120 of flip-flop 110 is high, however, during that portion of the pulse 42 which leads the pulse 44. Thus, an output occurs from NAND gate means 118 or 128 only from the time the leading pulse goes positive to the time the trailing pulse goes positive.

In this example, pulse 42 is leading and hence an output occurs from NAND gate means 128 for a period which is equal to the amount that pulse 42 leads pulse 44. This output is applied to NOR gate means 140 for inversion to provide the desired output pulse 62 on line 72. Had pulse 44 been leading, the NAND gate means 118 would have passed an output corresponding to the amount of lead to NOR gate means 140 for inversion. The delay means 122, 124 in the input lines to NAND gate means 128, 118, respectively, compensate for inherent delays in OR gate means 100, NAND gate means 112, and flip-flop 110 so that signals arriving at each input of the NAND gate means 128, and 118 will be in correct time relation.

A portion of the output of the NAND gate means 128 is applied by line 66 to set the bow-stern flip-flop 68 of FIG. 1 to indicate that the probe 14 received the energy wave before the probe 16 did. Resetting of the flip-flop 68, as well as of other flip-flops forming part of the pulse selector circuit 80 about to be described in detail, may be accomplished by a signal derived in any convenient manner from the echo synthesizer with which the system 10 is associated in use. For example, a synthesizer embodying the invention disclosed in the aforementioned patent application.

Figure 4:
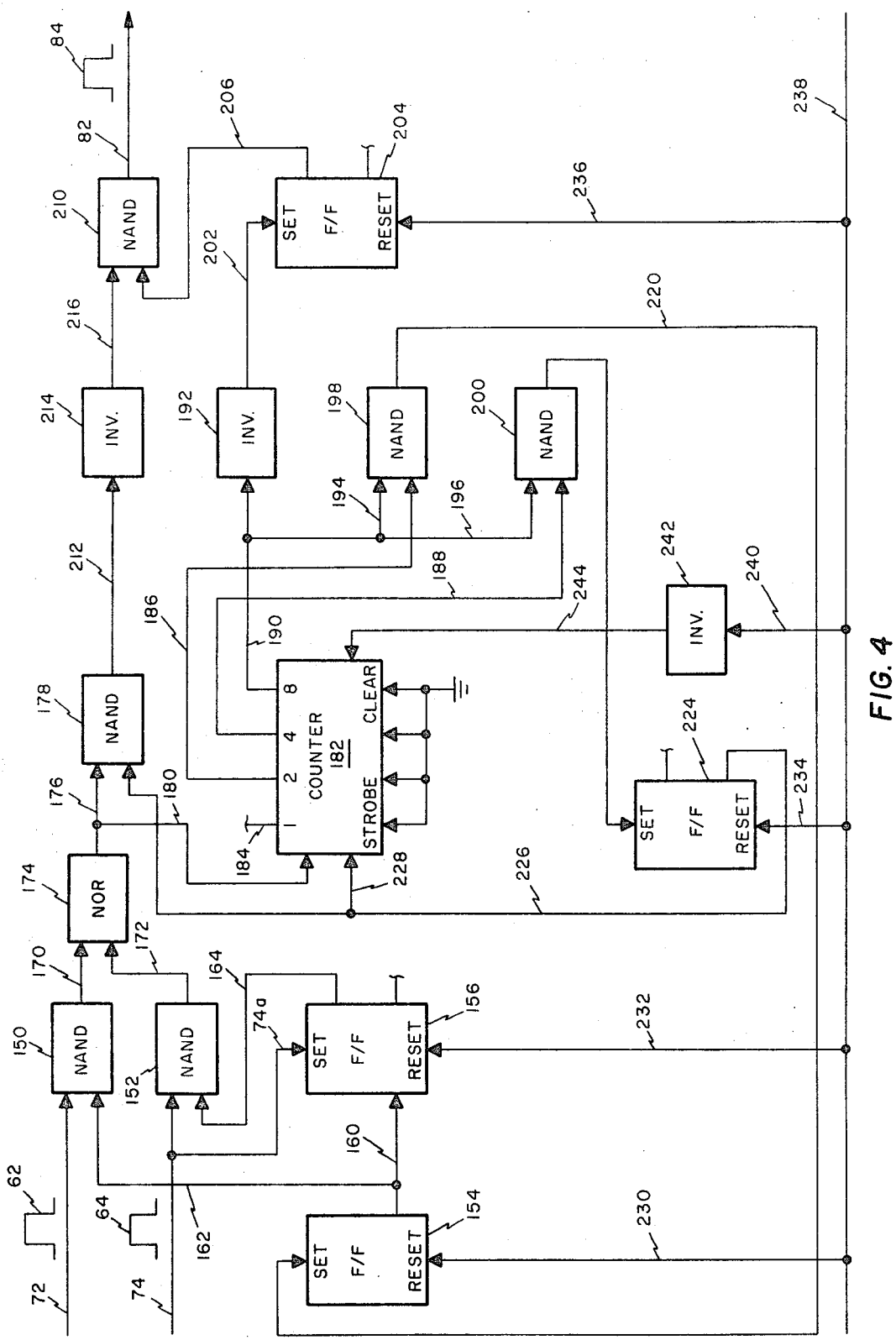
FIG. 4 is a block diagrammatic illustration in greater detail of the pulse selector circuit forming part of the system of FIG. 1.

Referring now to FIG. 4, the pulse selector circuit 80 comprises a first NAND gate means 150 connected to receive as one input thereto the pulses 62 via line 72 from circuit 50. A second NAND gate means 152 is connected to receive as one input thereto the pulses 64 via line 74 from circuit 60. The other inputs to the NAND gate means 150, 152 are derived from first and second flip-flops 154, 156 which are operated to inhibit one or the other of those NAND gate means in an alternative manner which will become apparent as the description proceeds. The flip-flop 154 has the stage from which its output is initially derived connected as shown by line 160 to the corresponding stage of the flip-flop 156 for the purpose of clamping the flip-flop 156 in its reset condition as long as the flip-flop 154 is in that condition irrespective of incoming signals via line 74a to the set terminal of flip-flop 156. The output line 160 is further connected by line 162 to the other input of the NAND gate means 150. The flip-flop 156 has one of its outputs connected via line 164 to the remaining input of the NAND gate means 152.

The outputs of NAND gate means 150 and 152 are connected respectively by lines 170, 172 to NOR gate means 174, the output of which is connected as shown by line 176 as one input to NAND gate means 178 and by line 180 as an input to a four-bit counter 182. The counter 182 is, in this example, one which has output lines 184, 186, 188, and 190 at which occurs successive condition changes or output signals when one, two, four, and eight input pulses have been received via line 180, and which then repeats with the ninth, 10th, 12th, etc. input pulses. Line 190 is connected to an inverter means 192 and by lines 194, 196 as one input to each of NAND gates 198 and 200. Line 186 provides the second input to NAND gate means 198, and line 188 provides the second input to NAND gate means 200. The output of the inverter 192 is applied as shown by line 202 to the set terminal of a flip-flop 204, which has one output connected as shown by line 206 to one input of a NAND gate means 210. The other input to the NAND gate means 210 is derived from the output of the NAND gate means 178 via line 212, an inverter 214 and line 216.

The output of the NAND gate means 198 is applied via line 220 to the set terminal of the flip-flop 154, while the output of the NAND gate means 200 is applied via line 222 to the set terminal of a flip-flop 224.

The flip-flop 224 has one output connected via line 226 to the remaining input to NAND gate means 178, and via line 228 to a data strobe terminal of the counter 182.

The flip-flop 154, 156, 224, and 204 are connected via lines 230, 232, 234, 236, and 238 to receive externally derived reset signals, which signals also serve to clear the counter 182 via line 240, an inverter 242, and line 244.

In the operation of the circuit 80, consider that the counter 182 has been cleared and each of the flip-flops reset. In this condition, the NAND gate means 150 and 178 are enabled by the output levels of flip-flops 154 and 224, respectively, while the NAND gate means 152 and 210 are inhibited by the outputs from flip-flops 156 and 204 respectively. Now, when pulses 62 and 64 arrive via lines 72, 74, only those pulses 62 on line 72 are passed to the NOR gate means 174 which passes such pulses via line 180 to the counter 182 and via line 176, enabled NAND gate means 178, line 212, inverter 214, and line 216 to NAND gate means 210. Because the gate means 210 is inhibited, no output is yet developed on line 82.

The counter 182 counts the trailing edges of the pulses arriving on line 180. At the end of the eighth pulse, a counter output is provided via line 190, inverter 192, and line 202 to set the flip-flop 204 so as to enable the NAND gate means 210. This clock output also enables NAND gate means 198 and 200 via lines 194, 196. The following two pulses arriving on line 72, that is the ninth and 10th pulses 62, produce output pulses 84 on line 82. At the end of the 10th pulse, the counter provides an output at line 186 which causes the previously enabled NAND gate means 198 to set the flip-flop 154, thereby disabling the NAND gate means 150 and unclamping the flip-flop 156 permitting it to be set via line 74a by the next trailing edge of a pulse 64 representing the time delay between probes 18 and 20 and entering on line 74, so as to enable the NAND gate means 152. The unclamping procedure assures that the NAND gate means will not be enabled while a pulse 64 is in progress and hence the output of circuit 80 will always consist of complete pulses and never a portion of a pulse. The importance of this is apparent when it is recalled that the widths of the train of pulses 84 are averaged to provide the desired end result, namely a value equal or proportional to $|\cos \theta|$.

The next two pulses 64 produce pulses 84 on the output line 82 and are also applied to the counter 182, to bring the total count therein to 12. At this time the counter provides an output on line 188 to NAND gate means 200 which causes flip-flop 224 to be set and thereby disable the NAND gate means 178 so no more pulses get to the output line 82. The output of flip-flop 224 upon setting is also applied via line 228 to enable the data strobe function of the counter 182. By having all parallel data input terminals 180a, 180b, 180c, 180d tied to ground, the output lines 184, 186, 188, and 190 all go to zero. This accomplishes the same thing as the initial clear input via line 244 which is used for the system reset. The use of the parallel inputs to zero the counter is advantageous where the counter forms a section of a larger counter.

As indicated earlier, the output of the circuit 80 consists of four pulses 84, two having widths equal to the ninth and 10th pulses 62 representing the time delay between probes 14 and 16, followed by two having widths equal to pulses 64 representing the time delay between probes 18 and 20. These four pulses are averaged by using them to gate the clock frequency from clock 92 to the counter 94 to provide a count which is proportional, or equal if a suitable clock frequency is selected, to $|\cos\theta|$.

Obviously many modifications and variations of the present invention are possible in the light of the above teachings. For example, other coincidence gates than NAND gates could be used, and other means than NOR gates could be used for providing on a common line the outputs of two preceding elements. In this regard, OR gate means is considered generic to both OR and NOR gate means. Also, as indicated earlier, three probes instead of four can be used by connecting them so that the center probe is common to both pairs. It is therefore to be understood that within the scope of the appended claims the invention may be practiced otherwise than as specifically described.

What is claimed is:

1. A system for detecting direction from which energy waves approach a body with minimum error due to energy reflected from the surface of said body, said system comprising:
    a first probe pair comprising first and second sensing probes disposed in spaced relation to one another along an axis extending normal to said surface;
    a second probe pair comprising at least a third sensing probe disposed on said axis and being disposed between said first pair and said surface;
    first means for providing a first series of pulses having widths equal to time delays extant between the outputs of said first pair of probes in response to passing signals;
    second means for providing a second series of pulses having widths equal to time delays extant between the outputs of said second pair of probes in response to said passing waves; and
    means for averaging together portions of said first and second series of pulses to provide an output which is directly proportional to $|\cos\theta|$ where $\theta$ is the angle between the direction of approach and said axis.

2. A system as defined in claim 1, and wherein said first and second means each comprises a pulse time comparison circuit comprising:
    OR gate means for providing as an output pulses each of which begins with the leading edge of a leading pulse input derived from one of said probes of a pair and ends with the trailing edge of a lagging pulse input derived from the other of said probes of that pair;
    first coincidence gate means for providing as an output pulses each having a width equaling the period of coincidence of said leading and lagging pulse inputs;
    flip-flop means, responsive to the outputs of said OR gate means and said first coincidence gate means, for producing a first output condition which begins with the leading edge of said lagging pulse and ends with the trailing edge of said lagging pulse and a second output condition at all other times;
    second coincidence gate means, responsive to said pulses derived from said one of said probes and to said output conditions of said flip-flop means, for providing output pulses having widths equaling the times during which said pulses derived from said one of said probes lead the pulses derived from said other of said probes;
    third coincidence gate means, responsive to said pulses derived from said other of said probes and to said output conditions of said flip-flop means, for providing output pulses having widths equaling the times during which said pulses derived from said other of said probes lead the pulses derived from said one of said probes; and
    NOR gate means for providing on a common output line the outputs of said second and third coincidence gate means as one of said first and second series of pulses.

3. A system as defined in claim 2, and wherein said means for averaging portions of said first and second series of pulses comprises:
    pulse selector circuit means, responsive to said first and second series of pulses as inputs, for rejecting a first predetermined number of pulses in one of said series, then selecting a second predetermined number of output pulses corresponding in width to pulses in said one of said series, and then selecting a third predetermined number of pulses but corresponding in width to pulses of the other of said series of pulses, whereby the output of said pulse selector circuit means consists of equal numbers of pulses having widths corresponding to said first and second series.

4. A system as defined in claim 3, and further comprising:
    clock means for providing clock signals of predetermined frequency;
    gate means, responsive to said output pulses of said selector circuit means, for passing numbers of said clock signals proportional in number to widths of said output pulses of said selector circuit means; and
    counter means, responsive to said signals passed by said gate means, for providing a count proportional to the average width of said output pulses of said selector circuit means and hence to $|\cos\theta|$.

5. A system as defined in claim 4, and comprising:
    second flip-flop means, responsive to the output of said second coincidence gate means, for providing first and second output conditions indicative of which of said probes of one of said pairs received said waves prior to the other, whereby ambiguity of direction of arrival of said waves is avoided.

6. A system as defined in claim 5, and wherein said pulse selector circuit comprises:
    fourth coincidence gate means for providing, when enabled, output pulses in response to said first series of pulses;

fifth coincidence gate means for providing, when enabled, output pulses in response to said second series of pulses;

third and fourth flip-flop means for providing signals for alternatively enabling said fourth and fifth coincidence gate means;

a second NOR gate means for providing on a common line output corresponding to the outputs of said fourth and fifth coincidence gate means;

second counter means, responsive to the output of said second NOR gate means, for providing signals corresponding to said first predetermined number, said second predetermined number, and said third predetermined number;

sixth and seventh coincidence gate means, connected in series with the output of said second NOR gate means, for providing output pulses from said second NOR gate means when both said sixth and seventh coincidence gates are enabled, but preventing such output when either is disabled;

fifth flip-flop means, responsive to said counter signal corresponding to said first predetermined number, for providing a condition which enables said seventh coincidence gate means;

eighth coincidence gate means, responsive to said signals corresponding to said second predetermined number, for causing said third flip-flop means to reverse its condition so as to disable said fourth coincidence gate means and to permit said fourth flip-flop means to reverse its condition at the next trailing edge of a pulse of said second series so as to enable said fifth coincidence gate means;

ninth coincidence gate means for providing an output in response to said signals corresponding to said third predetermined number; and sixth flip-flop means, responsive to said output of said ninth coincidence gate means, for disabling said sixth coincidence gate means, whereby the output of said pulse selector circuit is interrupted.

7. A system as defined in claim 6, and wherein:
said second and third predetermined numbers are equal.

* * * * *